| OPERATION PART | | | CLASS INDICATOR BEFORE OPERATION | | CLASS BEFORE | CLASS INDICATOR AFTER OPERATION | | CLASS AFTER |
|---|---|---|---|---|---|---|---|---|
| $FF_2$ | $FF_1$ | $FF_0$ | $FF_Y$ | $FF_X$ | | $FF_Y$ | $FF_X$ | |
| 1 | 1 | 1 | 0 | 0 | 0 | 0 | 1 | I |
| 1 | 1 | 0 | 0 | 0 | 0 | 1 | 0 | II |
| ALL OTHER OPERATION PARTS | | | 0 | 0 | 0 | 0 | 0 | 0 |
| 1 | 1 | 1 | 0 | 1 | I | 0 | 0 | 0 |
| ALL OTHER OPERATION PARTS | | | 0 | 1 | I | 0 | 1 | I |
| 1 | 1 | 1 | 1 | 0 | II | 0 | 0 | 0 |
| 1 | 1 | 0 | 1 | 0 | II | 1 | 0 | II |
| ALL OTHER OPERATION PARTS | | | 1 | 0 | II | 0 | 0 | 0 |

INVENTOR.
DAVID E. FERGUSON
BY Fulwider, Patton, Rieber, Lee, and Utecht
ATTORNEYS Jan. 14, 1969 D. E. FERGUSON 3,422,404

APPARATUS AND METHOD FOR DECODING OPERATION CODES IN DIGITAL COMPUTERS

Filed Feb. 23, 1966 Sheet 2 of 2

INVENTOR.
DAVID E. FERGUSON
BY Fulwider, Patton, Rieber, Lee, and Utecht
ATTORNEYS United States Patent Office 3,422,404

Patented Jan. 14, 1969

3,422,404

APPARATUS AND METHOD FOR DECODING OPERATION CODES IN DIGITAL COMPUTERS

David E. Ferguson, 101 Ocean Ave., Apt. B–7, Santa Monica, Calif. 90402

Filed Feb. 23, 1966, Ser. No. 529,360
U.S. Cl. 340—172.5 6 Claims
Int. Cl. G06f *7/00;* G06f *7/02;* H04l *3/00*

ABSTRACT OF THE DISCLOSURE

Apparatus and method for decoding operation codes in digital computers in which signal information indicative of different classes of operation codes is combined with a range of operation code words stored in the memory of the computer to produce output signals within the indicated class. Particular output signals cause the class indication to change so as to indicate another class of operation codes. The total number of output signals available is then greater than the stored range of operation code words.

The present invention relates to means for handling instructions in digital computers and, more particularly, to a novel decoder and method of decoding operation codes in digital computers.

In recent years, there has been a desire for digital computers to handle more and more operations and maximum amounts of information in each step of operation. At the same time, there has been a continuing desire to reduce, or at least not increase, the size and cost of memory units in digital computers. Unfortunately, the foregoing desires are effective opposites since to increase the number of operations which a computer can handle requires an increase in the word length of the operation parts of the computer commands which, in turn, requires an increase in size and cost of memory units storing the commands. Thus far, the opposite desires of increased computer operation capacity and decreased memory size and cost have defied a satisfactory combined solution.

It is therefore a general object of the present invention to provide such a combined solution, namely a method and means for increasing the operation field of computer commands without increasing the size and cost of computer memory units.

Another more specific object of the present invention is to provide a method and means for enabling the operation parts of computer commands to form a greater number of operation codes than is possible by rearrangement of the bit patterns of the operation parts and thereby maximize the operation codes which may be formed from a given word length operation part while minimizing the operation code memory storage requirements for an associated digital computer.

A further object of the present invention is to provide a decoder having the foregoing capabilities which is also relatively inexpensive to manufacture and reliable in its operation.

The foregoing as well as other objects and advantages of the present invention may be more clearly understood by reference to the following detailed description when considered with the drawings which, by way of example only, illustrate one form of operation decoder including the features of the present invention.

In a typical digital computer, the operation part of each command uniquely represents the entire operation code for the command. Because of the unique identification, the operation code of each command may be separately stored with its associated addresses in the computer's memory unit and the commands defined thereby may follow each other at random in a series of computer operations.

In practice, however, commands are not executed at random and a given instruction does not generally follow itself. Rather, the commands are executed in certain sequences. Recognizing this, the present invention employs a signal controllable redundancy technique in which the operation parts of computer commands combine with signal information indicative of different classes of commands to define a plurality of operation codes. This enables the same operation part to be utilized in several different operation codes and in fact makes it possible for the operation parts of computer commands to form a greater number of operation codes than is possible by a rearrangement of the bit patterns of the operation parts. The signal controllable redundancy technique of the present invention thereby maximizes the operation codes which may be formed from a given word length operation part while minimizing the operation code memory storage requirements for a digital computer. Stated differently, the redundancy technique enables a smaller word length operation part to represent the same number of different operation codes as a longer word length operation part in typical digital computers and allows a given word length operation part to represent a greater number of operation codes than a like word length operation part in typical computers.

Although the foregoing advantages are achieved with the sacrifice of the ability of permitting all commands to be executed completely at random and at any place in a sequence of operations, even after the execution of a like command, the reduction in operation part word length and memory storage requirements more than offsets the sacrifice, particularly in digital computers designed to handle small word sizes.

Figures 1, 3:
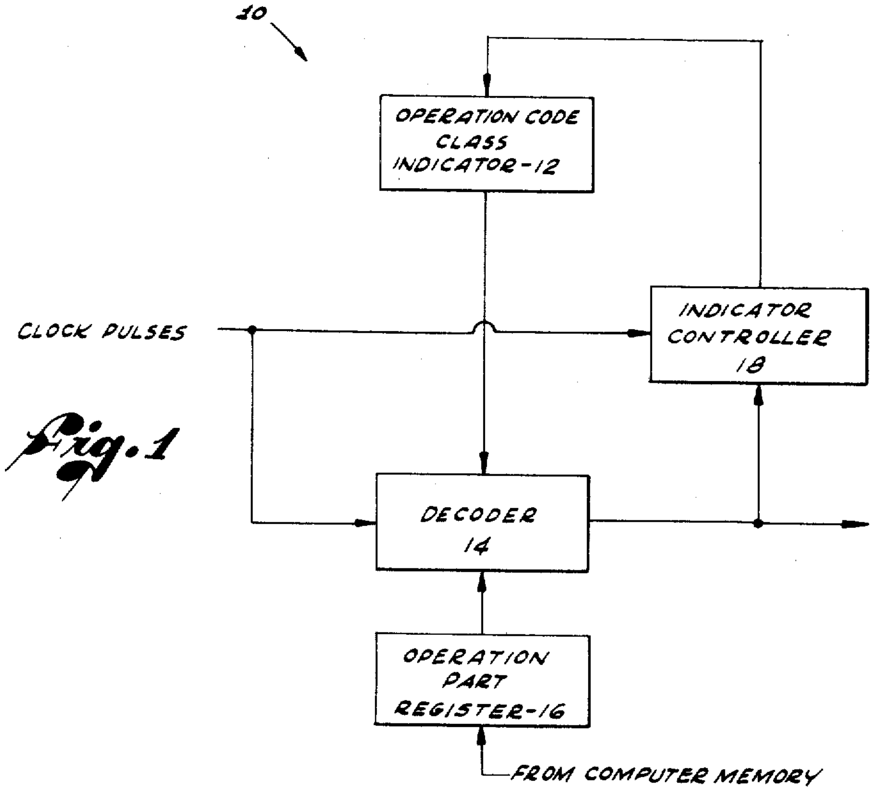
FIGURE 1 is a block diagram representation of the operation decoder illustrating the flow of information within the decoder.
FIGURE 3 is a table depicting operations within the operation decoder in response to particular operation parts from the memory unit in an associated computer.

Briefly, and with reference to FIGURE 1, in the present invention the signal controllable redundancy technique is embodied in an operation code decoder 10 including a signal controllable operation code class indicator 12 developing signal information indicative of different classes of operation codes for a digital computer. The signal information is applied to a decoder 14 together with operation parts of computer commands, the address parts of the commands being handled by other circuits. The operation parts are transmitted to the decoder 14 from a register 16 which, in turn, receives the operation parts from a memory unit (not shown) in the associated computer. The signal information and operation parts define different operation codes for the computer and are operated on in the decoder 14 to produce different output signals. The output signals, in turn, define the different operations to be executed by the computer and are also applied to an indicator controller 18. The indicator controller 18 is responsive to particular output signals to control the indicator 12 to develop signal information indicative of particular classes of operation codes.

This arrangement enables the operation parts of different computer commands to combine with the same signal information to define a series of operation codes within a given class of operation codes. Then, at the completion of the series, the last output signal is one which changes the signal information to represent a different class of operation codes. The same operation parts then may combine with the new signal information to define a different series of operation codes at the end of which the signal information again may be changed. This process may be repeated again and again for different signal information, whereby the number of operation codes formed from a given word length operation part is maximized and the memory storage requirements for operation codes minimized.

Figure 2:
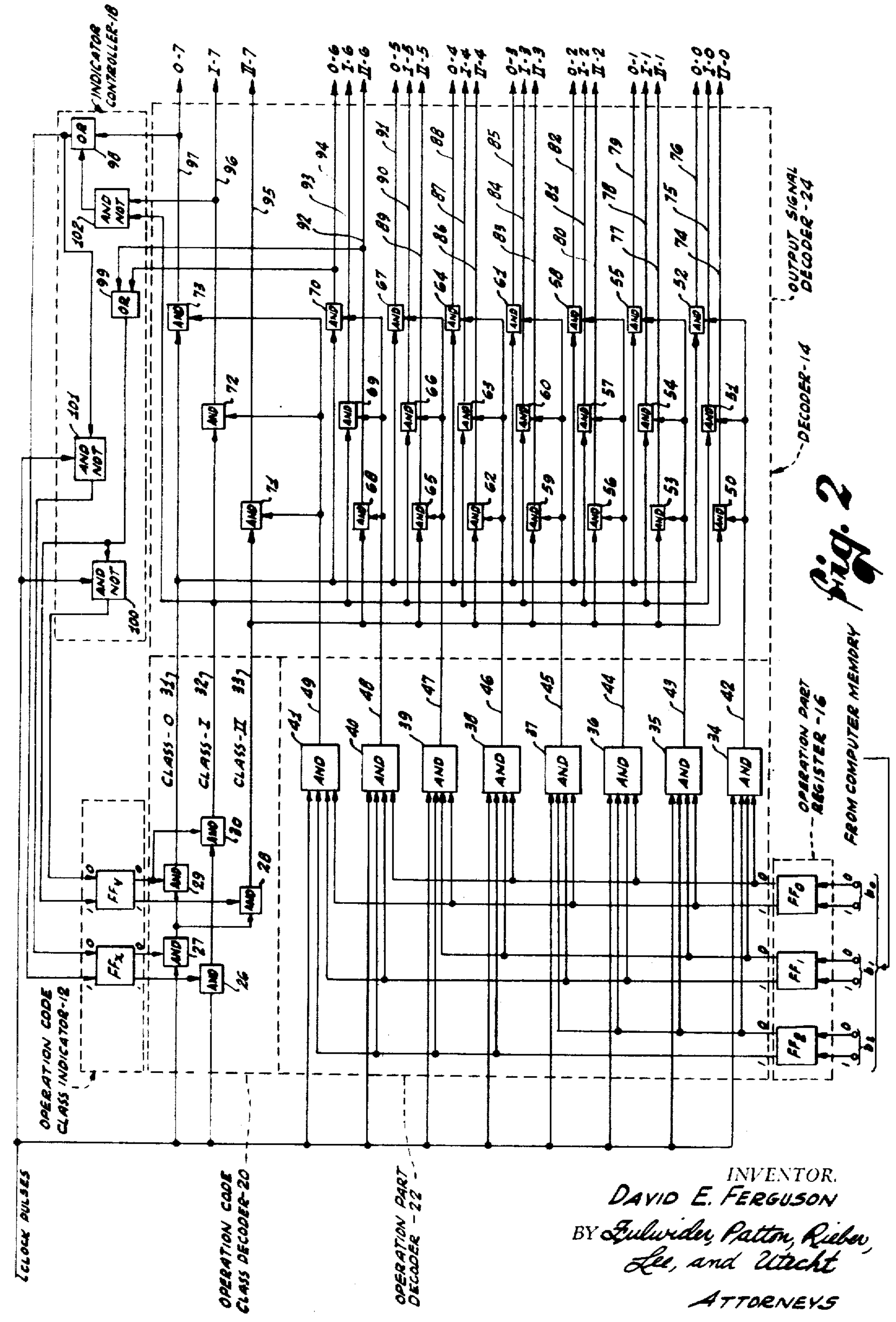
FIGURE 2 is a schematic representation of one form of circuitry for implementing the basic design of the operation decoder illustrated in FIGURE 1.

One circuit for implementing the operation decoder 10 of FIGURE 1 is illustrated in FIGURE 2 and, by way of example, utilizes and operates on three-bit words as the operation parts of computer commands and two-bit words as the signal information indicative of different classes of operation codes for the associated computer.

In this regard, the operation part register 16 includes three flip-flops $FF_0$, $FF_1$ and $FF_2$ for receiving different bits $b_0$, $b_1$ and $b_2$ from the memory unit of the computer. The bits $b_0$, $b_1$ and $b_2$ are the least to most significant bits of digital words representing different operation parts.

Similarly, the operation code class indicator 12 is a register including two flip-flops $FF_y$ and $FF_x$ for storing binary coded words indicative of different classes of operation codes. For example, when the word 00 is stored in $FF_y$ and $FF_x$, the indicator 12 is said to be conditioned to develop signal information indicative of operation code class 0. When the word 01 is stored in $FF_y$ and $FF_x$, the indicator 12 is conditioned to develop signal information indicative of operation code class I. Similarly, when the word 10 is stored in $FF_y$ and $FF_x$, the indicator 12 is said to be conditioned to develop signal information indicative of operation code class II.

The decoder 14 and the controller 18 are designed to receive and operate upon the signal information and operation parts to produce diverent output signals and to control the operation code class indicating words in the indicator 12, in accordance with the following logical expressions:

$$Y' \leftarrow b_2 b_1 \bar{b}_0 \bar{X}$$

$$X' \leftarrow (X - b_2 b_1 b_0)\bar{Y}$$

where X and Y represent the state of $FF_x$ and $FF_y$ before operation of the decoder 10; X′ and Y′ represent the state of $FF_x$ and $FF_y$ after operation of the decoder; $b_0$, $b_1$ and $b_2$ represent the operation part bits and states of $FF_0$, $FF_1$ and $FF_2$; $\bar{X}$, $\bar{b}_0$ and $\bar{Y}$ represent "not" X, $b_0$ and Y, that is, a zero condition in $FF_x$, $FF_0$ and $FF_y$; the minus sign (−) represents either but not both, that is, an exclusive "or"; and the arrow represents replacement, that is to say that the state of $FF_x$ and $FF_y$ after operation (X′ and Y′) becomes that represented by the expressions to the right of the arrows.

Referring to the chart of FIGURE 3, and in accordance with the foregoing expressions, when the indicator 12 is indicating class 0, a binary coded operation part 111 will produce an output signal (0–7 in FIGURE 2) which will cause the indicator 12 to store the word 01 indicative of the operation code class I. When the indicator 12 is indicating class 0 and a binary coded operation part 110 is in the operation part register 16, an output signal (0–6 in FIGURE 2) is produced which causes the indicator 12 to store the word 10 indicative of the operation code class II. All other binary coded operation parts have no effect upon the indicator 12 when indicating the code class 0.

When the indicator 12 is indicating the operation code class I, a binary coded operation part 111 will produce an output signal (1–7) which causes the indicator to store the word 00 indicative of the operation code class 0. All other operation parts cause the indicator 12 to continue to indicate the change to code class I.

When the indicator 12 is indicating a class II, all the binary coded operation parts except 110 will produce output signals which change the indicator to store the words 00 indicative of the operation code class 0. The operation part 110 has no effect upon the indicator 12.

To implement the foregoing operations, the decoder 14 includes an operation class decoder 20, an operation part decoder 22, and an output signal decoder 24.

The operation code class decoder 20 includes five "and" gates 26 through 30. The and gates are arranged to pass selectively control signals to three output lines 31, 32 and 33 to indicate the operation of code classes 0, I and II, respectively, when clock pulses are applied thereto and when the words 00, 01 and 10 are stored in $FF_y$ and $FF_x$.

More particularly, the inputs to the and gate 26 are connected to a clock pulse source, either internal or external to the computer, and to the binary "1" output of $FF_x$; the inputs to the and gate 27 to the clock pulse source and to the binary "0" output of $FF_x$; the inputs to the and gate 28 to the output of the and gate 27 and the binary "1" output of $FF_y$; the inputs to the and gate 29 to the output of the and gate 27 and the binary "0" output of $FF_y$; and the inputs to the and gate 30 to the output of the and gate 26 and the binary "0" output of $FF_y$—the outputs of the and gates 29, 30 and 28 being connected to the output lines 31, 32 and 33, respectively. Thus arranged, when the word 00 is stored in the class indicator 12, the binary "0" outputs of $FF_y$ and $FF_x$ are energized and a control signal is passed to the output line 31 upon the occurrence of a clock pulse. Similar operations occur to pass control signals to the output lines 32 and 33 when the words 01 and 10 are stored in the class indicator 12 and clock pulses are applied thereto.

The operation part decoder 22 includes eight "and" gates 34–41 arranged to energize selectively eight output lines 42–49 with operation signals when clock pulses are applied thereto and the operation parts stored in the register 16 represent binary coded words 0–7, respectively.

More particularly, the inputs of the and gate 34 are connected to the binary "0" outputs of $FF_0$, $FF_1$ and $FF_2$ and to the clock pulse source while the output of the and gate is connected to the output line 42. The inputs to the and gate 35 are connected to the binary "1" output of $FF_0$, the binary "0" outputs of $FF_1$ and $FF_2$, and to the clock pulse source, while the output of the and gate is connected to the output line 43. In the and gate 36, the inputs are connected to the binary "0," binary "1" and binary "0" outputs of the flip-flops $FF_0$, $FF_1$ and $FF_2$, respectively, and the clock pulse source, while the output of the and gate is connected to the output line 44. In the and gate 37, the inputs are connected to the binary "1" outputs of $FF_0$ and $FF_1$, the binary "0" output of $FF_2$ and to the clock pulse source, while the output of the and gate is connected to output line 45. The inputs to the and gate 38 are connected to the binary "0", binary "0" and binary "1" output of $FF_0$, $FF_1$ and $FF_2$ and the clock pulse source and the output of the and gate is connected to the output line 46. In the and gate 39, the inputs are connected to the binary "1," binary "0" and binary "1" ouputs of $FF_0$, $FF_1$ and $FF_2$ and the clock pulse source and the output of the and gate is connected to the output line 47. The inputs to the and gate 40 are connected to the binary "0," binary "1" and binary "1" outputs of $FF_0$, $FF_1$ and $FF_2$ and the clock pulse source, and the output is connected to the output line 48. In the and gate 41, the inputs are connected to the binary "1" outputs of $FF_0$, $FF_1$ and $FF_2$ and to the clock pulse source, and the output is connected to the output line 49.

With the operation part decoder 22 thus arranged, when the operation part stored in a register 16 is 000, the occurrence of a clock pulse energizes the and gate 34 to pass an operation signal to the output line 42. In similar manners, the output lines 43–49 are selectively energized when the binary words stored in the operation part register 16 represent the numbers 1–7, respectively.

The output signal decoder 24 is adapted to receive and combine the control and operation signals to develop different output signals for each combination. To accomplish this, the decoder 24 includes a matrix of "and" gates 50–73 connected to the output lines 31–33 and 42–49 to selectively energize particular output lines 74–97 when the control signals and operation signals are indicative of the operation code class operation parts designated immediately adjacent the output lines 74–97 (see FIGURE 2).

More particularly, one input of each of the and gates 52, 55, 58, 61, 64, 67, 70 and 73 is connected to the output line 31 and the outputs thereof to the output lines 76, 79, 82, 85, 88, 91, 94, and 97, respectively. One input of each of the and gates 51, 54, 57, 60, 63, 66, 69 and 72 is connected to the output lines 32 and the outputs thereof to the output lines 75, 78, 81, 84, 87, 90, 93 and 96, respectively. One input of each of the and gates 50, 53, 56, 59, 62, 65, 68, 71 is connected to the output line 33 and the outputs thereof to the output lines 74, 77, 80, 83, 86, 89, 92 and 95, respectively. The remaining input of the and gates 50, 51 and 52 is connected to the output line 42; of and gates 53, 54 and 55 to output line 43; of and gates 56, 57 and 58 to the output line 44; of and gates 59, 60 and 61 to the output line 45; of and gates 62, 63 and 64 to the output line 46; of and gates 65, 66 and 67 to put line 48; of and gates 71, 72 and 73 to the output line 49.

With the output signal decoder 24 thus arranged, when the control signal indicates class 0 and the operation signal indicates a binary coded operation part 000, an output signal passes through the and gate 52 to energize the output line 76. When the control signal is indicative of the class I and the operation signal indicates a binary coded operation part 010, the output line 81 is energized by the passing of an output signal through the and gate 57. In like manner, the other combinations of the control signals and operation signals excite different ones of the output lines, as indicated in FIGURE 2, by output signals passing through the associated and gates of the output signal decoder 24.

As previously mentioned, particular output signals from the decoder 24 cause the controller 18 to control the signal information developed by the indicator 12. To accomplish this, the controller 18 includes "or" gates 98 and 99 and "and-not" or "exclusive or" gates 100, 101, and 102. The inputs to the and-not gate 102 are connected to the output line 96 of the decoder 24 and the output line 32 of the decoder 20 while the output is connected to one input to the or gate 98. The other input to the or gate 98 is connected to the output line 97 while the output is connected both to one input to the and-not gate 101 and to the binary "1" input to $FF_x$. The remaining input to the and-not gate 101 is connected to the clock pulse source while its output is connected to the binary "0" input of $FF_x$. The inputs to the or gate 99 are connected to the output lines 92 and 94 while the output is connected both to one input to the and-not gate 100 and the binary "1" input to $FF_y$. The remaining input to the and-not gate 100 is connected to the clock pulse source while its output is connected to the binary "0" input of $FF_y$.

With the controller 18 thus arranged, when $FF_y$ and $FF_x$ store a binary coded word 00, indicative of the code class 0, and a binary coded word operation part 111 is stored in the operation part register 16, the occurrence of a clock pulse energizes the output line 97 of the output signal decoder 24. The output signal produced on the output line 97 is applied to the or gate 98 passed thereby and applied in common to the input to the and-not gate 101 and the binary "1" input to $FF_x$. The clock pulse blocks the passage of the output signal through the and-not gate 101 while energizing the binary "0" input to $FF_y$ through the and-not gate 100. Accordingly, $FF_x$ is set to a binary 1 state while $FF_y$ remains in its 0 state causing the indicator 12 to store the binary word 01 indicative of the operation code class I.

If a binary coded word 110 indicative of the numeral 6 is stored in the operation part register 16 rather than 111 and the indicator 12 is storing the word 00, the occurrence of a clock pulse energizes the output line 94 rather than the output line 97. The output signal on the output line 94 is applied to one input to the and-not gate 100 and to the binary "1" input to $FF_y$ through the or gate 99. The clock pulse blocks passage of the output signal through the and-not gate 100 and energizes the binary "0" input to $FF_x$ through the and-not gate 101. Thus, $FF_y$ switches to a binary 1 state while $FF_x$ remains in the 0 state such that the indicator 12 stores the binary word 10 indicative of the operation code class II.

All other operation parts and output signals produced thereby have no effect upon the indicator when storing the binary coded word 00 indicative of the class 0. Therefore, the operation parts may be changed at random to represent numerals 0–5 without changing the class of computer operation codes indicated by the indicator 12.

When the indicator 12 stores the binary word 01, indicative of the code class I, and binary coded word 111 is stored in the register 16, the occurrence of a clock pulse energizes the output line 96 to apply an output signal to one input to the and-not gate 102. The output signal however, is blocked from passing through the and-not gate 102 by the control signal on the output line 32 from the decoder 20. Under such conditions, the clock pulses energize the binary "0" inputs of $FF_y$ and $FF_x$ through and-not gates 100 and 101 to cause the indicator to store the word 00 indicative of operation code class 0.

All other operation parts produce output signals having no effect upon the indicator 12 in class I operation, and $FF_y$ and $FF_x$ continue to store the word 01. In particular, for all output signals other than I–7 on output line 96, the control signal on line 32 is applied in common to the binary "1" input to $FF_x$ and to the and-not gate 101 through the and-not gate 102 and or gate 98. The clock pulse blocks passage of the control signal through the and-not gate 101 and energizes the binary "0" input to $FF_y$ through the and-not gate 100. In this manner $FF_y$ and $FF_x$ continue to store the word 01 in response to all operation parts other than 111.

When $FF_y$ and $FF_x$ store the binary coded word 10, indicative of the operation code class II, and any three bit binary coded word other than 110 (numeral 6) is stored in the register 16, the application of a clock pulse to the decoder 10 energizes the binary "0" inputs to $FF_y$ and $FF_x$ through the and-not gates 100 and 101. This causes the indicator 12 to store the word 00 indicative of operation code class 0. The operation part 110 and output signal produced thereby, however, cause the indicator 12 to continue to store the word 10 indicative of class II. In particular, the operation part 110 produces an output signal which is applied to the and-not gate 100 and to the binary "1" input to $FF_y$ through the or gate 99. The clock pulse blocks the passage of any signal through the and-not gate 100 and energizes the binary "0" input to $FF_x$ through the and-not gate 101. Thus, $FF_y$ and $FF_x$ remain in their previous states storing the word 10 indicative of the operation code class II.

From the foregoing, it is appreciated that the same operation parts may combine with different signal information to produce a greater number of operation codes than is possible by rearrangement of the bit patterns of the operation parts. This maximizes the number of operation codes which may be produced from a given word length operation part and minimizes the memory storage requirements for operation codes in the computer. In particular, the binary coded operation parts representing numbers 0–5 may combine at random with signal information indicative of the operation code class 0 to define a series of computer operations without changing the signal information in the indicator 12. Then, at the end of the series, either a binary coded operation part 110 or 111, representative of numerals 6 or 7, will energize the output lines 94 or 97 to cause the signal information to change to indicate either an operation code class I or II.

In class I, binary coded operation parts representative of numbers 0 through 6 may combine at random with the signal information to define a series of computer operations without changing the signal information. Then at the end of the series, a binary coded operation part 111, representative of number 7 will change the signal information to that indicative of operation code class 0 for the computer.

In class II, a binary coded operation part 110, representative of number 6, will combine with the signal information to define a short series of computer operations since all other operation parts change the signal information to that indicating operation code class 0 for the computer.

In the foregoing manner, the illustrated form of the present invention provides a novel means and method for maximizing the number of operations which may be performed by a computer without increasing the size or cost of the memory unit utilized to store the operation codes within the computer. This, the present invention accomplishes by increasing the number of operation codes which may be formed from a given word length operation part while either reducing or at least maintaining intact the size and cost of the computer memory unit required to store the operation parts of the computer commands.

While in the foregoing, a particular decoder and method of decoding operation codes has been described in some detail, changes and modifications may be made therein without departing from the spirit of the invention. It is therefore intended that the present invention be limited in scope only by the terms of the following claims.

I claim:

1. An operation code decoder for use in a digital computer, comprising:

first means for developing signal information indicative of different classes of operation codes for said computer;

second means for receiving said signal information from said first means and operation parts of computer commands from memory in said computer and for producing different output signals in response thereto, said signal information and operation parts defining different operation codes for said computer;

and third means for controlling said first means to develop signal information indicative of particular classes of operation codes in response to particular output signals from said second means, whereby an operation part may combine with different signal information to define a plurality of different operation codes thereby maximizing the number of operation codes formed from a given word length operation part and minimizing operation code memory storage requirements for said computer.

2. The operation code decoder of claim 1 wherein said first means includes a register for storing different digital words indicative of different classes of operation codes for said computer.

3. The operation code decoder of claim 2 wherein said third means includes means for changing said digital words in said register to other digital words indicative of others of said different classes of operation codes in response to particular output signals from said second means.

4. The operation code decoder of claim 2 wherein said second means includes means for decoding said digital words and operation parts to produce different control and operation signals and means for operating on said control and operation signals to produce said different output signals.

5. The operation code decoder of claim 4 wherein said third means includes means for changing said digital words in said register to other digital words indicative of others of said different classes of operation codes in response to particular output signals from said second means.

6. An operation code decoder for use in a digital computer comprising:

first means for producing digital-word control signals indicative of different classes of operation codes;

second means for producing digital-word operation signals from the operation parts of computer commands stored in the memory of the computer;

third means for combining said operation and control signals to produce digital-word output signals; and fourth means for changing said control signals in response to particular output signals.

References Cited

UNITED STATES PATENTS

| | | | |
|---|---|---|---|
| 3,300,763 | 1/1967 | Hoehmann | 340—172.5 |
| 3,289,175 | 11/1966 | Rice | 340—172.5 |
| 3,273,129 | 9/1966 | Mullery et al. | 340—172.5 |
| 3,105,143 | 9/1963 | Hosier et al. | 235—157 |
| 3,054,987 | 9/1962 | Lawrence et al. | 340—172.5 |
| 3,018,956 | 1/1962 | Hosier et al. | 235—157 |

GARETH D. SHAW, *Primary Examiner.*

U.S. Cl. X.R.

340—347